United States Patent

Gervais et al.

[11] Patent Number: 5,984,773
[45] Date of Patent: Nov. 16, 1999

[54] METHOD AND APPARATUS FOR REGULATING THE INTERNAL PRESSURE OF A VENTILATED, CLOSED SPACE SUBJECTED TO VARIATIONS IN EXTERNAL PRESSURE

[75] Inventors: Yves Gervais, Poitiers; Gilles Mariaux, Beynac; Gérard Mineaud, Perigny; Alain Guinot, St Rogatien; Pierre Andre, Salles Sur Mer, all of France

[73] Assignee: GEC Alsthom Transport SA, Paris, France

[21] Appl. No.: 08/898,247

[22] Filed: Jul. 22, 1997

[30] Foreign Application Priority Data

Jul. 23, 1996 [FR] France ................................ 96 09210

[51] Int. Cl.$^6$ ........................................................ F24F 11/04
[52] U.S. Cl. ............................................. 454/70; 454/105
[58] Field of Search ................................ 454/70, 74, 105, 454/238

[56] References Cited

U.S. PATENT DOCUMENTS

| Re. 24,990 | 5/1961 | Del Mar | 454/74 |
| 2,407,257 | 9/1946 | Del Mar | 454/74 |
| 2,549,673 | 4/1951 | Del Mar | 454/74 |
| 2,549,690 | 4/1951 | Klemperer | 454/74 |
| 3,473,460 | 10/1969 | Emmons | 454/74 |
| 5,137,490 | 8/1992 | Ishikawa et al. | 454/105 X |

*Primary Examiner*—Harold Joyce
*Attorney, Agent, or Firm*—Sughrue, Mion, Zinn, Macpeak & Seas, PLLC

[57] ABSTRACT

A regulating apparatus and a regulating method for regulating the internal pressure $P_i$ of a ventilated, closed volume subjected to variations in external pressure $P_e$, the apparatus including at least two compensation circuits enabling the intake air flow rate $q_1$ and the extraction air flow rate $q_2$ to be adjusted in real time so that the difference between these two flow rates algebraically compensates for the leakage flow rate $q_f$, and maintains the internal pressure $P_i$ inside the volume at a constant level.

15 Claims, 2 Drawing Sheets

METHOD AND APPARATUS FOR REGULATING THE INTERNAL PRESSURE OF A VENTILATED, CLOSED SPACE SUBJECTED TO VARIATIONS IN EXTERNAL PRESSURE The present invention relates generally to an apparatus for regulating pressure in moving or stationary volumes that are relatively airtight and that require the air in them to be renewed, and more particularly to a method and apparatus for regulating the internal pressure of a ventilated, closed space subjected to variations in external pressure.

BACKGROUND OF THE INVENTION

It is recalled that the term "regulating" means maintaining the physical magnitude to be regulated at a predetermined constant value.

The apparatus of the present invention is suitable for being applied to two different categories of equipment.

A first category concerns regulating the internal pressure of any moving, ventilated vehicle subjected to variations in external pressure, e.g. consequent upon rapid changes in its aerodynamic field or upon variations in altitude.

By way of example, very high speed trains may be mentioned.

In this first category of equipment, unregulated variations in pressure would be physiologically unpleasant for the user.

A second category generally concerns any ventilated volume in communication with a varying external pressure.

In a vehicle or a volume in which internal air is renewed by air-conditioning or ventilation using external air, the internal pressure is close to the external pressure.

Variations in external pressure are passed on almost instantaneously to the inside of the volume because of the dimensions of the sectionals of the ventilation circuits. The time constant with which pressure variations are transmitted to the inside of air-conditioned or ventilated vehicles is thus often small, because of the very characteristics of the ventilation circuits.

By way of example, it is known that when a vehicle moving through the atmosphere passes close to an obstacle (a tunnel entrance, a bridge, various objects in the vicinity of the track or road, etc), or when going past another vehicle, the field of aerodynamic velocities that the vehicle conveys with it is deformed.

Such a phenomenon results in rapid variations in pressure on the external walls of the vehicle.

The higher the speed of the vehicle, the more pronounced this effect is, since the pressures are approximately proportional to the square of the speed.

In particular, when very high speed trains enter tunnels or cuttings, rapid variations in pressure occur on the external walls of the rail cars. These sudden variations propagate through the confined space constituted by the tunnel or by the cutting, and they are known as "pressure waves".

Furthermore, these pressure waves, which propagate through the external confined space, are reflected at its ends, thereby creating return pressure waves that are as large as the direct waves.

These variations are passed rapidly on to the insides of the vehicles mainly via the ventilation or air-conditioning circuits, which is very unpleasant for the passengers.

It is thus common to be subjected to pressure variations that can reach 2,000 Pascals in less than one second.

The invention is also applicable to any volume ventilated by means of an air intake circuit and of an air extraction circuit, the circuits being in contact with the external pressure, and regardless of whether or not the volume leaks.

By way of example, the volume may communicate with the outside other than via the above-defined circuits, e.g. via openings, permeable gaskets, doors or windows that are not completely sealed, W.C. vents, etc.

Variations in external pressure are generally transmitted very rapidly, almost instantaneously, to the volume via leaks but above all via the ventilation circuits which are often very permeable to such variations.

Such variations in pressure are generally not attenuated very much, and they can be physiologically unpleasant, as in very high speed trains.

The installations in question, whether they be stationary volumes or vehicles, are such that it is not possible to shut off the ventilation circuits for long periods during external pressure variations since a minimum level of air renewal must be provided Similarly, it is not possible, for technological reasons, to achieve perfect sealing between the inside and the outside of the volume.

OBJECTS AND SUMMARY OF THE INVENTION

An object of the invention is to provide an apparatus for regulating the internal pressure to around a reference level, thereby making it possible to satisfy a certain number of user-comfort criteria.

In practice, a rapid variation in pressure is unpleasant or even dangerous to the ear, as a result both of the rate at which the pressure varies over time, and also as a result of the difference between the instantaneous pressure and the reference pressure.

To guarantee user comfort, these two magnitudes:

rate of variation over time of the internal pressure, and difference between the instantaneous internal pressure and the reference pressure, must remain within defined values.

For hygiene reasons, the rate of renewal of the air must be good and always as close as possible to the nominal rate of air renewal.

An object of the invention is to provide a regulating apparatus for regulating the internal pressure of a ventilated, closed volume subjected to variations in external pressure, which apparatus makes it possible to maintain the pressure of the volume around a reference pressure so that the absolute value of the difference between the internal pressure and the reference pressure, and the rate of variation over time of the internal pressure remain less than thresholds dictated by conditions of comfort.

In the regulating apparatus of the invention for regulating the internal pressure $P_i$ of a ventilated, closed volume subjected to variations in external pressure $P_e$ there are at least two compensation circuits enabling the intake air flow rate $q_1$ and the extraction air flow rate $q_2$ to be adjusted in real time so that the difference between these two flow rates algebraically compensates for the leakage flow rate $q_f$, and maintains the internal pressure $P_i$ inside the volume at a constant level.

The regulating apparatus of the invention is such that two compensation circuits replace the conventional ventilation circuits, namely the intake circuit and the extraction circuit, or such that a compensation circuit is associated in parallel with each of the conventional ventilation circuits, i.e. with the intake circuit and with the extraction circuit.

In the latter case, the compensation circuits are activated and the conventional ventilation circuits are closed off concomitantly.

The regulating apparatus of the invention also satisfies at least one of the following characteristics:

each of said compensation circuits includes a fan having specific characteristics, and a control member for controlling the instantaneous flow rate;

the regulating apparatus includes a regulating system using the signal output by a pressure sensor and serving to generate the actuation signals supplied to actuator members driving said control members for controlling the instantaneous flow rates in real time; and the regulating apparatus includes a dynamic sensor for sensing static pressure, which sensor is situated inside said volume.

According to the invention, the method of regulating the internal pressure $P_i$ of a ventilated, closed volume subjected to variations in external pressure $P_e$ includes the following steps:

when the pressure $P_i$ inside the volume drops below a reference pressure $P_{ref}$, an internal pressure sensor supplies information to a regulating system which then acts rapidly and smoothly to close an air extraction circuit to some extent so as to cause the corresponding flow rate $q_2$ to drop, while the intake circuit remains open, so that the difference between the intake air flow rate $q_1$ and the extraction air flow rate $q_2$ algebraically compensates for the leakage flow rate $q_f$, and maintains the pressure $P_i$ at a level that is constant and that is close to the reference pressure $P_{ref}$ or set-point pressure $P_c$;

when the pressure $P_i$ inside the volume rises above the reference pressure $P_{ref}$, the regulating system causes an air intake circuit to be closed partially and smoothly, while the extraction circuit remains open; and when the instantaneous internal pressure $P_i$ is equal to the reference pressure $P_{ref}$, both the intake circuit and the extraction circuit remain open.

The regulating method of the invention also satisfies at least one of the following characteristics:

in order to regulate the pressure $P_i$ inside the volume to around a constant value, it is necessary at any time for the total flow rate of air entering the volume to be equal to or close to the total flow rate of air leaving the volume, including leaks, and, when a pressure difference between the internal pressure $P_i$ and the external pressure $P_e$ causes an increase in the flow rate in one of the compensation circuits and a decrease in the other, the incoming flow rate is made equal to the outgoing flow rate, including leaks, by reducing the flow rate in that circuit whose flow rate increases under the effect of the pressure difference, by closing it in controlled manner, until the sum of that flow rate and of the leakage flow rate is equal to the flow rate in the other circuit, which remains totally open, its flow rate tending to decrease under the effect of the pressure difference, the flow rate in said other circuit corresponding to the flow rate for renewing the air in the volume;

when the amplitude of the variations in external pressure exceeds the maximum value for normal use, both compensation circuits are then completely closed so as to limit the variations in the internal pressure to as small as possible; and the maximum value for normal use corresponds to the maximum pressure that can be generated by the fans.

According to the invention the regulating method of the invention is such that, when the compensation circuits are not in action, the flow rate control members shut off said circuits completely, while the valves are open, and the air in the volume is renewed via the conventional air intake circuit and air extraction circuit, and when the compensation circuits are in action, the conventional ventilation circuits are shut off by two-position valves.

The regulating method is such that the internal pressure $P_i$ at a given instant is stored by means of a storage system, the stored pressure then being taken as the reference internal pressure $P_{ref}$, the storage command either being of external origin, or being generated by the regulating system.

The regulating system controls the change in the internal pressure $P_i$ towards the reference pressure $P_{ref}$ by complying with a rate of variation dictated by conditions of comfort, when a difference appears between the two pressures $P_i$ and $P_{ref}$.

The regulating method is such that the flow rates in the compensation circuits can be varied by positive displacement pumps whose speeds of rotation are adjusted continuously by a regulating system.

An advantage of the regulating apparatus of the invention is that it guarantees that the air inside the volume is renewed at a rate that can be close to or equal to the nominal rate.

BRIEF DESCRIPTION OF THE DRAWINGS

Other objects, characteristics, and advantages of the invention appear on reading the following description of a preferred embodiment of the regulating apparatus and of variant embodiments thereof given with reference to the accompanying drawings, in which.

DETAILED DESCRIPTION OF THE PREFERRED EMBODIMENT

The present invention consists in maintaining the pressure $P_i$ in the volume 1 at a level that is as close as possible to the stored reference value regardless of the external pressure $P_e$, taking into account the leaks 2 and while ensuring that the air in the volume 1 is renewed.

The regulating apparatus of the invention is autonomous in that it does not receive forecast information regarding any possible instantaneous variation in external pressure, and similarly it acts independently of the way in which the physical phenomenon that varies the external pressure changes. Operation of the apparatus depends only on instantaneous information relating to the internal pressure, optionally supplemented by information about the external pressure or about any physical phenomenon related to these pressures, e.g. instantaneous flow rates $q_1$, $q_2$.

The general principle of the regulating apparatus of the invention consists in adjusting, in real time, the intake air flow rate $q_1$ and the extraction air flow rate $q_2$ so that the difference between the two flow rates algebraically compensates the leakage flow rate $q_f$, thereby maintaining the pressure $P_i$ in the volume 1 at a constant level.

The solution of the invention makes it possible to renew the air at a satisfactory rate, as explained below and under certain conditions.

Figure 1:
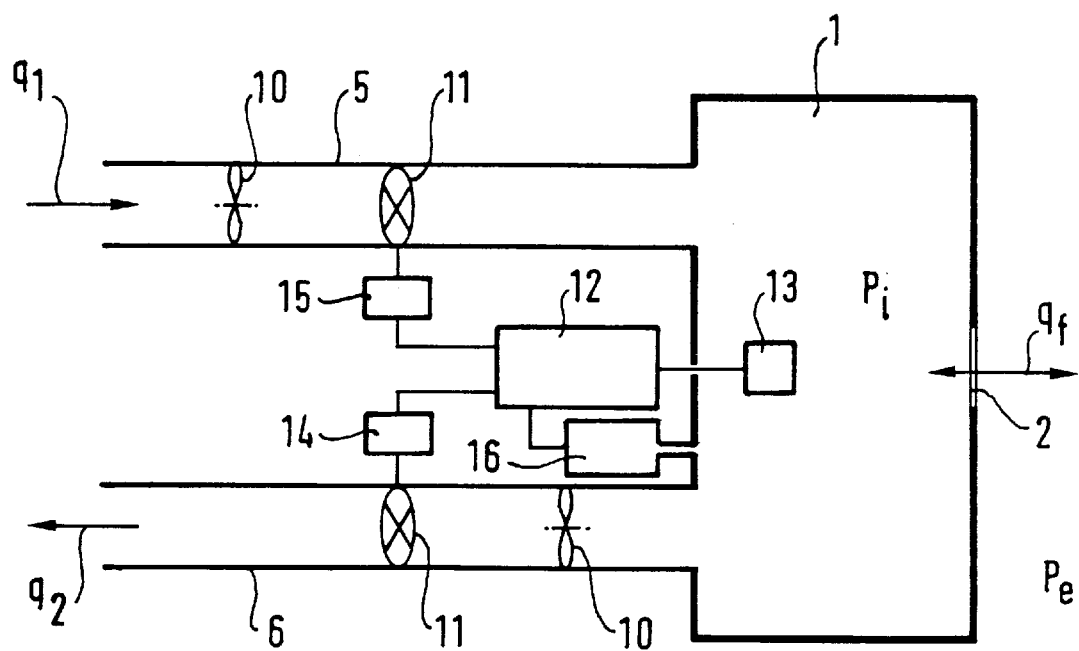
FIG. 1 is a block diagram summarizing the principle of the regulating apparatus of the invention.
Figure 2:
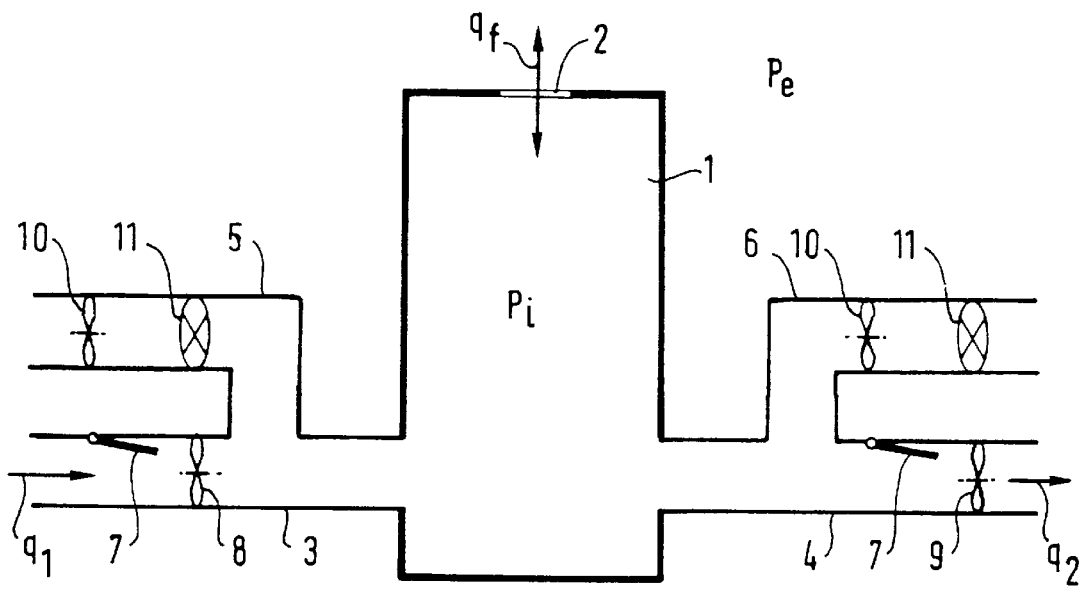
FIGS. 2 and 3 show how the compensation circuits of the regulating apparatus of the invention operate respectively in permanent mode and in temporary mode.
Figure 3:
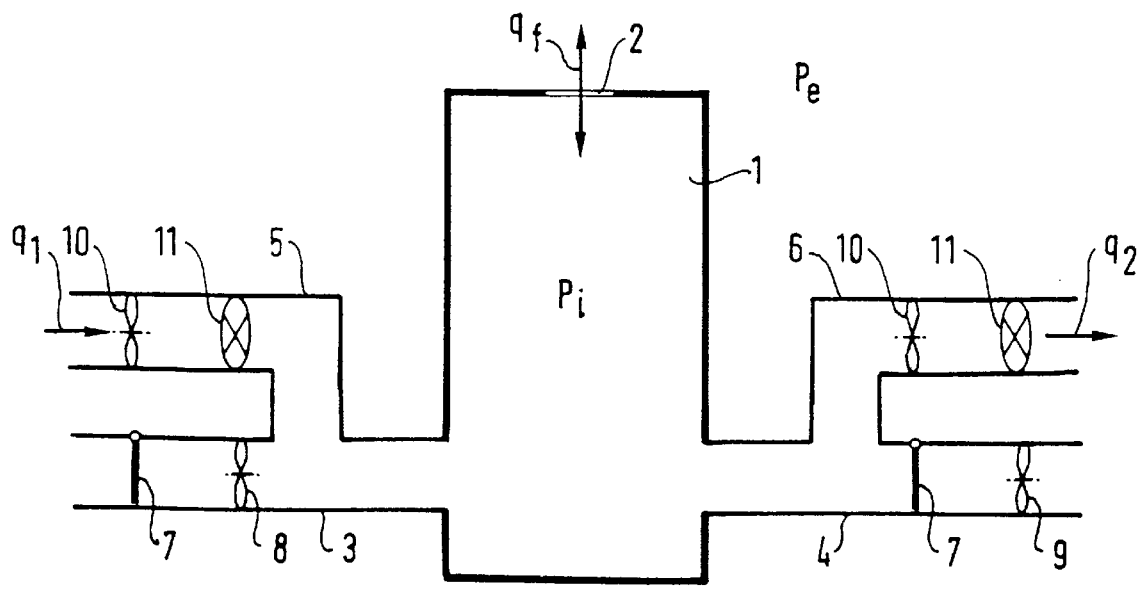

In a first embodiment of the invention, the conventional ventilation circuits, namely the intake circuit 3 and the extraction circuit 4 as shown in FIGS. 2 and 3, are replaced with two compensation circuits 5 and 6, as shown in FIG. 1.

In another embodiment of the invention, the conventional ventilation circuits, namely the intake circuit 3 and the extraction circuit 4, are associated in parallel with the compensation circuits 5 and 6, as shown in FIGS. 2 and 3.

Each of the conventional ventilation circuits includes, for example, a two-position valve 7, and either an intake fan 8 or an extractor fan 9 depending on the circuit in question.

The compensation circuits 5 and 6 make it possible to provide a flow rate of renewal air.

Each of the compensation circuits 5 and 6 is equipped in particular with a fan 10 having specific characteristics, and with a control member 11 for controlling instantaneous flow rate, e.g. by instantaneously modifying the geometry of the circuit, by means of valves.

The control apparatus proper is constituted by at least four elements, namely:

a storage system 16 for storing the internal pressure value chosen as the reference pressure, a measurement system 13 for measuring the internal pressure and for detecting pressure variations;

a regulating system 12 using the signal output by a pressure sensor 13 and serving to generate the actuation signals supplied to actuator members 14 and 15 for driving said control members 11 for controlling the instantaneous flow rates in real time; and the two actuator members 14 and 15, e.g. actuators, whose positions are regulated and which are driven by the actuation signals supplied by the regulating system 12.

The apparatus thus includes a dynamic sensor 13 for sensing static pressure, which sensor is situated inside the volume 1 so as to supply an instantaneous signal to the regulating system 12.

Depending on the way in which the internal pressure varies relative to the reference pressure $P_{ref}$, the regulating system 12 generates commands that are supplied to the actuator members 14 and 15, enabling the flow rates in the circuits 5 and 6 to be regulated.

It is essential to measure the pressure $P_i$ inside the volume, and, in order to increase the speed of compensation, it is possible to add an external sensor to enable the actuator members 14 and 15 to anticipate the action they need to take to deal with disturbances due to variations in external pressure $P_e$.

When the pressure $P_i$ inside the volume 1 drops below the reference pressure $P_{ref}$, the internal pressure sensor 13 supplies the regulating system 12 with an item of information, optionally supplemented by another item of information, the regulating system then acting rapidly and smoothly to close to some extent the air extraction circuit 6 so as to cause the corresponding flow rate $q_2$ to decrease.

The difference between the intake air flow rate $q_1$ and the extraction air flow rate $q_2$ thus algebraically compensates for the leakage flow rate $q_f$ and, in this way, maintains the pressure $P_i$ at a level which is constant and close to the reference pressure $P_{ref}$ or of the setpoint pressure $P_c$.

When the pressure $P_i$ inside the volume 1 rises above the reference pressure $P_{ref}$, the regulating system 12 causes the air intake circuit 5 to be closed partially and smoothly, while the extraction circuit 6 remains open.

When the instantaneous internal pressure $P_i$ is equal to the reference pressure $P_{ref}$, both the intake circuit 5 and the extraction circuit 6 remain open.

In order to regulate the pressure $P_i$ inside the volume 1 to around a constant value, it is necessary, at any instant, for the total flow rate of air entering the volume to be equal to or close to the total flow rate of air leaving the volume, including leaks.

A pressure difference between the internal pressure $P_i$ and the external pressure $P_e$ causes an increase in the flow rate in one of the compensation circuits 5, 6 and a decrease in the flow rate in the other compensation circuit 6, 5, together with a leakage flow rate $q_f$.

The incoming flow rate and the outgoing flow rate, including leaks, are equalized by reducing the flow rate in that circuit in which the flow rate increases under the effect of the pressure difference, by closing that circuit in a controlled manner until the sum of that flow rate and of the leakage flow rate is equal to the flow rate in the other circuit.

Said other circuit remains totally open and its flow rate tends to decrease under the effect of the pressure difference, the value of the variation in flow rate being a function of the flow rate-to-pressure characteristic curve of the fan 10 having specific characteristics.

The flow rate in the circuit that remains totally open corresponds to the flow rate for renewing the air in the volume.

Insofar as the flow rate-to-pressure characteristic curves of the fans used are such that firstly the flow rates they generate depend little on the upstream and downstream pressure conditions, and secondly the magnitudes of the leaks from the volume and of the variations in external pressure remain within values tolerated by the fans, the flow rate in the circuit that remains totally open does not decrease significantly.

In addition, the reduction in the flow rate in the controlled circuit is small.

Thus, the renewal of the air in the volume always remains close to its nominal rate.

Conversely, if the characteristics of the fans are such that, in the circuit that remains open, the flow rate of air decreases considerably, in particular during maximum variations in external pressure, then the air renewal flow rate decreases accordingly.

If, exceptionally, the amplitude of the variations in external pressure reaches or exceeds the maximum value for normal use, i.e. the maximum pressure that can be generated by the fans, the two compensation circuits are then completely closed so as to limit the variations in internal pressure to be as small as possible.

Each compensation circuit includes a fan whose operating point (nominal flow rate) is set by the headloss of the associated flow rate.

Each of the circuits is provided with a flow rate regulating member (valve, flap, etc.) which is driven by an actuator (pneumatic actuator, electric motor, etc) whose position is regulated. One of the circuits serves to take air in while the other serves to extract it.

The regulating apparatus for regulating the pressure inside the volume may be digital or analog, and it establishes actuation signals for the actuators on the basis of the pressure signals supplied by the pressure sensor situated inside the volume, and by any additional sensors.

In addition, the invention includes a mechanical or electrical system making it possible to store the reference pressure.

This system consists, for example, of an airtight volume in permanent contact with the reference of the internal relative pressure sensor.

The volume is put in contact with the external pressure temporarily via an electrically controlled valve for storing the pressure, e.g. at the entrances of tunnels.

The regulating apparatus may either be installed in parallel with conventional ventilation circuits, or else it may itself perform the functions of such conventional ventilation circuits.

Several variants of the invention are possible, and the following description relates to such variants.

As regards installation of sensors:

The basic version of the apparatus includes a single pressure sensor situated inside the volume. This sensor is essential since it measures the magnitude to be regulated.

However, it is possible to provide additional sensors such as a sensor measuring the external pressure.

Such a measurement supplies a signal which, when used by the regulating system, can make it possible to increase the performance levels of the apparatus by anticipating the action that needs to be taken by the flow rate regulating members. It should also be noted that the signal used by the regulating system may be obtained on the basis of the instantaneous measurement of any physical magnitude related to variations in external pressure (the instantaneous flow rate or the instantaneous speed of the air in the circuits, etc.).

As regards operation of the compensation circuits:

The compensation circuits may operate permanently or temporarily.

If the external pressure variations appear occasionally, it is preferable to switch over temporarily from the existing circuits to the compensation circuits as shown in FIGS. 2 and 3.

An advantage of this variant is that it saves energy because the compensation circuits are powered only during the periods when pressure variations can appear.

Two two-position valves enable this switching to be performed.

As regards the flow rate regulating means:

Regulating the flow rates in the compensation circuits requires, a priori, two distinct valves.

However, insofar as only one of the circuits is controlled at any one time (at least one of the two circuits is open), it is possible to use a single valve having two ports.

Such a two-port valve is implemented, for example, using a cylinder provided with apertures offset in rotation in a shell, or with two planes provided with apertures and mounted to move in translation relative to each other (sash system), or else by means of a part of varying cross-section mounted to move in translation in one or more orifices of a constant section.

If, for technological reasons, it is difficult to dispose the two circuits adjacent to each other or to implement such a valve, it is always possible to apply the instruction either to one or to the other of the actuators, or for the actuators to respond to signals of opposite signs.

Furthermore, to ensure that the pressure regulating system is stable, it is advantageous to choose valves such that the variation in the headloss that they cause as a function of their position is as linear as possible, the variations relating to conventional valves often being of the exponential type and leading to large stresses on the actuators which drive them and to a reduction in the performance of the system.

As regards the configuration of the motor-driven fans:

In order to limit the volume taken up by the fans, one variant consists in driving both fans with a single motor by fixing them to respective ends of the shaft of the motor.

As regards regulating the rate of pressure variation over time:

If the external pressure changes between the moment at which the regulation starts and the moment at which it is to end (e.g. as a result of a change in level undergone by a vehicle in a tunnel), it is possible to manage stopping of the system by causing the setpoint pressure to slide so as to control the rate of variation over time of the pressure inside the volume.

As regards the variation of the flow rates in the circuits:

Another way of varying the intake air flow rate or the extraction air flow rate consists in acting on the speed of rotation of the motor-driven fans by modifying the electrical power supply to the motors, e.g. by supplying AC of varying voltage and of varying frequency.

As regards producing the air flow rates:

The air flow rates may be produced by positive-displacement pumps or compressors. In practice, with this type of equipment, modulating the flow rate is possible only by acting on the speed of rotation.

As regards starting or stopping the system:

The system for controlling the internal pressure is, in the simplest case, started or stopped by an external signal.

In a variant, the system may be autonomous, i.e. the reference pressure is stored and the system is started by a variation in internal pressure or in external pressure being detected, and on the basis of the processing of the signal(s) from the pressure sensor(s).

The system may be stopped by detecting the absence of variations in external pressure and in internal pressure, or else on the basis of any other reliable criterion.

The pressure-regulating apparatus of the invention may also make it possible for the internal pressure to return to being in equilibrium with the external pressure when there is a change in altitude, while complying with a rate of variation over time that is dictated by conditions of comfort.

The apparatus of the invention for regulating the internal pressure $P_i$ of a ventilated, closed volume subjected to variations in external pressure $P_e$, is particularly suited to rolling stock going through tunnels or going past obstacles.

The regulating apparatus of the invention may be started or stopped by fixed installations delivering tunnel entrance and exit information.

The internal pressure in the rail cars is regulated throughout their transit time in the tunnel relative to the setpoint pressure stored at the entrance to the tunnel.

This solution offers the advantage of requiring only a single pressure sensor situated inside the volume of the rail car.

If, as a result of a change in level, the external pressure is different from the internal pressure, it is possible to manage stopping of the system by sliding the setpoint in controlled manner so as to limit the rate of variation over time of the pressure in the rail car.

Further to the above description, the regulating method of the invention is such that, when the compensation circuits (5, 6) are not in action, the flow rate control members (11) shut off said circuits completely, while the valves (7) are open, and the air in the volume (1) is renewed via the conventional air intake circuit (3) and air extraction circuit (4), and, when the compensation circuits (5, 6) are in action, the conventional ventilation circuits (3, 4) are shut off by two-position valves (7).

Preferably, the internal pressure $P_i$ at a given instant is stored by means of a storage system, the stored pressure then being taken as the reference internal pressure $P_{ref}$, the storage command either being of external origin, or being generated by the regulating system (12).

The regulating system (12) controls the change in the internal pressure $P_i$ towards the reference pressure $P_{ref}$ by complying with a rate of variation dictated by conditions of comfort, when a difference appears between the two pressures $P_i$ and $P_{ref}$.

The regulating method of the invention is such that the flow rates in the compensation circuits can be varied by positive displacement pumps whose speeds of rotation are adjusted continuously by a regulating system (12).

Since the delivery flow rates of positive displacement pumps are almost insensitive to the pressure difference between the internal pressure $P_i$ and the external pressure $P_e$, the difference in flow rates between the air intake pump and the air extraction pump merely needs to compensate algebraically for the leakage flow rate $q_f$.

We claim:

1. A regulating apparatus which regulates an internal pressure $P_i$ measured of a ventilated, closed volume subjected to variations in external pressure $P_e$, said apparatus comprising:

at least two compensation circuits which enable an intake air flow rate $q_1$ and an extraction air flow rate $q_2$ to be adjusted in real time so that a difference between the flow rate q1 and the flow rate q2 algebraically compensates for a leakage flow rate $q_f$, and maintains an internal pressure $P_i$ inside the volume at a constant level.

2. The regulating apparatus according to claim 1, in which the two compensation circuits replace conventional ventilation circuits, including an intake circuit and an extraction circuit.

3. The regulating apparatus according to claim 2, in which each of the compensation circuits is associated in parallel with each of the conventional ventilation circuits.

4. The regulating apparatus according to claim 3, in which the compensation circuits are activated and the conventional ventilation circuits are closed off concomitantly.

5. The regulating apparatus according to claim 2, in which each of the compensation circuits comprises:

a fan having predetermined characteristics, and a control member which controls an instantaneous flow rate.

6. The regulating apparatus according to claim 5, further comprising:

a pressure sensor disposed within said volume; and a regulating system using a signal output by said pressure sensor and serving to generate actuation signals supplied to actuator members driving each said control member which controls the instantaneous flow rate in real time.

7. The regulating according to claim 1, further comprising a dynamic sensor for sensing static pressure, which sensor is situated inside said volume.

8. A method of regulating an internal pressure $P_i$ of a ventilated, closed volume subjected to variations in external pressure $P_e$, said method comprising the steps of:

supplying information to a regulating system using an internal pressure sensor when the pressure $P_i$ inside the volume drops below a reference pressure $P_{ref}$;

at least partially closing an air extraction circuit using the regulating system, so as to cause a corresponding extraction air flow rate $q_2$ to drop, while an intake circuit remains open, so that a difference between an intake air flow rate oil and the extraction air flow rate $q_2$ algebraically compensates for a leakage flow rate $q_f$, and maintains the pressure $P_i$ at a constant level which is close to at least one of the reference pressure $P_{ref}$ and setpoint pressure $P_c$;

partially closing the air intake circuit using the regulating system, while the extraction circuit remains open, when the pressure $P_i$ inside the volume rises above the reference pressure $P_{ref}$; and keeping the intake circuit and extraction circuit open when an instantaneous internal pressure $P_i$ is equal to the reference pressure $P_{ref}$.

9. The regulating method according to claim 8, further comprising the step of:

reducing a flow rate in one of at least two compensation circuits to regulate the pressure $P_i$ inside the volume to about a constant value and make a total flow rate of air entering the volume equal to or close to a total flow rate of air leaving the volume, including leaks, when a pressure difference between the internal pressure $P_i$ and the external pressure $P_e$ causes an increase in a flow rate in said one of two compensation circuits and a decrease in a flow rate in the other of said two compensation circuits, the flow rate in said one of two compensations circuits increasing under an effect of the pressure difference, by closing said one of two compensation circuits in a controlled manner, until a sum of the flow rate of said one of two compensation circuits and of a leakage flow rate is equal to a flow rate in the other of said two compensation circuits, which remains totally open, the flow rate of the other of said two compensation circuits tending to decrease under the effect of the pressure difference, the flow rate in the other of said two compensation circuits corresponding to a flow rate for renewing air in the volume.

10. The regulating method according to claim 9, further comprising the step of:

closing completely both compensation circuits when an amplitude of the variations in external pressure $P_e$ exceed a maximum value for normal use, so as to limit the variations in the internal pressure $P_i$.

11. The regulating method according to claim 10, wherein said compensation circuits include fans, and the maximum value for normal use corresponds to a maximum pressure that can be generated by the fans.

12. The regulating method according to claim 9, wherein said compensation circuits include control members which control flow rates, and when said compensation circuits are not in action, the flow rate control members shut off said compensation circuits completely, while valves are open, and the air in the volume is renewed via a conventional air intake circuit and air extraction circuit, and when said compensation circuits are in action, the conventional air intake circuit and air extraction circuit are shut off by two-position valves.

13. The regulating method according to claim 8, wherein the internal pressure $P_i$ at a given instant is stored by means of a storage system, the stored pressure then being taken as a reference internal pressure $P_{ref}$, a storage command either being one of external origin and being generated by the regulating system.

14. The regulating method according to claim 13, wherein the regulating system controls a change in the internal pressure $P_i$ towards the reference pressure $P_{ref}$ by complying with a rate of variation dictated by conditions of comfort, when a difference appears between the two pressures $P_i$ and $P_{ref}$.

15. The regulating method according to claim 9, wherein the flow rates in said compensation circuits can be varied by positive displacement pumps whose speeds of rotation are adjusted continuously by the regulating system.

* * * * *

UNITED STATES PATENT AND TRADEMARK OFFICE
CERTIFICATE OF CORRECTION

PATENT NO. : 5,984,773

DATED : November 16, 1999

INVENTOR(S) : Yves Gervais, Gilles MARIAUX, GERARD MINEARD, Alain GUINOT, and Pierre ANDRE It is certified that error appears in the above-identified patent and that said Letters Patent is hereby corrected as shown below:

On the Title Page: of the patent, under the "References Cited, U.S. PATENT DOCUMENTS" portion, please add the following references which were cited in an Information Disclosure Statement filed July 22, 1997 and resubmitted on December 6, 1999:

| | | |
|---|---|---|
| 4,428,529 | 1/1984 | BENTSEN |
| 4,741,257 | 5/1988 | WIGGIN et al. |

On the cover page of the patent, under the "References Cited, FOREIGN PATENT DOCUMENTS" portion, please add the following references which were cited in an Information Disclosure Statement filed July 22, 1997 and resubmitted on December 6, 1999:

| | | |
|---|---|---|
| 92 08082 | 5/1992 | World Office PCT |
| 07 00 818 A1 | 3/1996 | Europe |

Signed and Sealed this

Tenth Day of April, 2001

Attest:

NICHOLAS P. GODICI

*Attesting Officer*   *Acting Director of the United States Patent and Trademark Office*